United States Patent Office 3,225,068
Patented Dec. 21, 1965

3,225,068
EPOXIDIZED DIESTERS OF FATTY ACID AND POLYOXYETHYLENE TETRAHYDROFURAN DICARBINOL
John D. Zech, Wilmington, Del., assignor to Atlas Chemical Industries, Inc., Wilmington, Del., a corporation of Delaware
No Drawing. Filed June 29, 1962, Ser. No. 206,150
3 Claims. (Cl. 260—347.4)

This invention relates to new compounds which are plasticizers for vinyl resins and to plasticized vinyl resin compositions, particularly plasticized polyvinyl chloride and copolymers of vinyl chloride and vinyl acetate.

It is an object of this invention to provide novel plasticizers for vinyl resin compositions.

Another object of this invention is to provide epoxidized substances which have superior properties when employed as plasticizers for such plastic materials as vinyl chloride or vinyl chloride and vinyl acetate resins.

Another object is to provide vinyl resin compositions plasticized with plasticizers which contribute markedly to the thermal stability of the composition.

A further object is to provide plasticized vinyl resin compositions of superior low temperature flexibility characteristics.

The above and other objects will become apparent in the course of the following description and the appended claims.

In general, the resin compositions contemplated by the present invention contain a vinyl resin, a stabilizer and a plasticizer. The vinyl resin is selected from the group consisting of vinyl chloride polymers and copolymers of vinyl chloride and vinyl acetate, said copolymers containing not more than about 15% vinyl acetate. Such resins are well known in commerce, and need no further characterization.

Conventional stabilizers for vinyl resins, which may be employed in the compositions of the present invention, are likewise well known in the resin and plastics art. Example of such conventional stabilizers that are adapted to use in vinyl resin compositions and that are adapted to use in this invention include: alkaline earth-metal soaps, resinates, oxides or carbonates, aromatic amines, epichlorohydrin, organo-tin compounds, epoxidized oils, phenoxypropene oxide and dibutyl laurate.

According to the present invention, plasticizers for vinyl resin are provided which have not heretofore been disclosed in the prior art and vinyl resin compositions are provided which by virtue of the presence of these novel plasticizers have markedly increased thermal stability and superior flexibility at low temperatures.

The plasticizers of the present invention may be described as being diesters of oxyethylated 2,5-bis (hydroxymethyl) tetrahydrofuran (hereinafter referred to simply as tetrahydrofuran dicarbinol) and epoxidized fatty acids.

In general, plasticizers of the present invention may be obtained by: (1) reacting an alkylene oxide, for example, ethylene oxide, with tetrahydrofuran dicarbinol to form an oxyethylated tetrahydrofuran dicarbinol product; (2) reacting this product with 2 mols of an unsaturated fatty acid to form the diester of the oxyethylated product, and; (3) epoxidizing the unsaturated fatty acid groups of the product of step (2).

Generally, if the number of added alkylene oxide groups falls below about 2, the final resin product produced by the method of this invention will be found to be susceptible to splitting when flexed under conditions of moderately extreme, −65° F., cold. If the number of added alkylene oxide groups is greater than 8, the final product produced by the method of this invention will generally be found to be unsuited to use as a plasticizer because the final resin product exhibits undesirable sensitivity to water. The number of alkylene oxide groups which are reacted with each mol of tetrahydrofuran dicarbinol in step (1) above may desirably vary from about 2 to about 8. Preferably, the number of alkylene oxide groups ranges between 3 and 6, and within this range, the products are eminently suited to use in the invention.

The unsaturated fatty acid suited to use in step (2) and epoxidized in step (3) may be any higher aliphatic unsaturated fatty acid, for example, oleic, linoleic, linolenic, undecylinic, palmitoleic, erucic, eleostearic, or licanic acids. A suitable source of unsaturated fatty acid may be any naturally occurring product that yields such acids such as soya oil, linseed oil and safflower oil. Preferably, the fatty acids suited to use in this invention contain from about 12 to 18 carbon atoms. The heat stability of the final resin product improves as the percent of epoxidation of the unsaturated fatty acid group in the plasticizer mixture increases. Generally when less than 25% of the olefinic groups in the plasticizer mixture has been epoxidized the final resin product has an undesirably low heat stability. Therefore, preferably at least about 25% of the unsaturated in the plasticizer mixture is epoxidized and as this figure approaches 100%, the heat stability is improved.

An example of a plasticizer which has been found eminently satisfactory for use in vinyl resin composition is polyoxyethylene (4) tetrahydrofuran dicarbinol di(9,10 epoxy stearate). In the foregoing expression, the figure (4) indicates the number of mols of ethylene oxide added to each mol of the compounds.

The proportions of components of the novel plasticized vinyl resin compositions will vary over a considerable range according to the choice of ingredients and the purpose for which the composition is intended. In general, however, useful compositions are obtained by employing from about 15% to about 65% by weight of plasticizer to the total weight of vinyl resin.

For various special purposes to which the compositions may be put, it may be desirable to also incorporate other ingredients such as dyes, fillers, pigments, other plasticizers, other stabilizers, or other resins either synthetic or natural. For preparing coating compositions various solvents may be used such as alcohols, esters, ketones and hydrocarbons.

The following examples illustrate the preparation and use of the epoxidized substances of this invention:

Example I

A polyoxyethylene (4) tetrahydrofuran dicarbinol starting material was prepared by reacting tetrahydrofuran dicarbinol with ethylene oxide. 948 g. of tetrahydrofuran dicarbinol and 5.4 g. of sodium hydroxide, as a catalyst, were placed in a two gallon autoclave. The autoclave was sealed and sufficient ethylene oxide led in to increase the pressure to between 20 and 30 p.s.i.g. The mixture was then heated to a temperature of 120° C. As the reaction proceeded, additional ethylene oxide was added to maintain the pressure within the 20 to 30 p.s.i.g. range. After 1264 g. of ethylene oxide had been added, which took a period of about 1 hour, the pressure was allowed to drop to 0 p.s.i.g. The temperatures were maintained for an additional ½ hour and the reaction product, polyoxyethylene (4) tetrahydrofuran dicarbinol, was removed from the autoclave. The product yield was substantially 100%.

1540 g. (5.46 mols) of oleic acid, 840 g. (2.72 mols) of tetrahydrofuran dicarbinol oxyethylated with four mols of ethylene oxide per mol of tetrahydrofuran dicarbinol and 23 g. of p-toluene sulfonic acid were charged into a flask equipped with a stirrer and thermometer.

The temperature was raised gradually from 120° C. to 185° C. over a 5.5 hour period and held there for another 6 hours to complete the esterification.

The product was cooled, diluted with benzene and washed with sodium carbonate solution until neutral. The benzene solution was then stripped under reduced pressure to remove solvent.

The mass was then cooled to 120° C. and 1% by weight of the charge of active carbon was added. After one hour at 120° C., the mixture was filtered. The product was an amber, oily liquid, being polyoxyethylene (4) tetrahydrofuran dicarbinol dioleate, which analyzed as follows: Acid Number 1.5, Saponification Number 140, Hydroxyl Number 10, and Iodine Number 58.4.

1752 g. (2.09 mols unsaturated) of the above diester and 45 g. of anhydrous sodium acetate were charged into a flask equipped with a thermometer, a stirrer, a reflux condenser and an additional funnel. The charge was cooled to 20° C. by use of a cold water bath. Over a period of one hour, 915 g. (4.6 mols) of 40% peracetic acid were added, the temperature of the charge being maintained between 15 and 20° C. by means of a cold water bath. After the addition of peracetic acid, the charge was held at 20° C. for 2 hours and then the temperature allowed to increase to 31° C. for 1 hour and then to 55° C. for another hour.

The charge was then cooled to room temperature and transferred into a separatory funnel. An equal volume mixture of solutions of 5% by weight sodium bicarbonate and 0.5% sodium chloride was utilized to wash the product and the wash continued until the wash effluent became alkaline. The reaction product was then washed with distilled water until the wash water was neutral. The washed product then transferred to a flask equipped with a distillation head, a condenser, and a receiver and vacuum stripped to dryness.

The final product after vacuum stripping was a light yellow oil which had the following analysis: Epoxide Equiv. 543, Acid Number 1.9, Saponification Number 135.5, Hydroxyl Number 28 and Iodine Number 4.2, and was determined to be substantially polyoxyethylene (4) tetrahydrofuran di (9,10 epoxy stearate).

*Example II*

50 parts by weight of the product of Example I, 100 parts by weight of polyvinyl chloride, 2 parts by weight of a heat stabilizer, Ferro 1234, a product of Ferro Chemical Corporation, believed to be a metallic salt of a fatty acid such as barium laurate, and 0.5 part by weight of stearic acid as a lubricant were kneaded together until a homogeneous mixture was obtained. The mixture was fed into a roll mill operating at a temperature of approximately 300° F. with a roll clearance of 0.04 inch. The mixture was fluxed into a sheet, the formed sheet removed from the mill, rotated 90° and again placed in the mill. This procedure was repeated until three passes had been completed. The plastic sheet stock was then allowed to band and the roll clearance adjusted to produce a small rolling bank of material between the rolls. After each minute of banding, the stock is cut from each side of the band and added to the bank. After five cuts have been completed, the clearance was adjusted to 0.04 inch and the resultant polyvinyl chloride sheet product removed from the mill.

The heat stability of the product was tested by exposing a portion of the milled sheet product to a temperature of 350° F. for a period of two hours. Although during the test the product changed from a very slightly amber to slightly amber in color, no noticeable decomposition was observed.

The cold stiffness property of the product was determined by testing a sample of the milled sheet product in accord with the procedure described in ASTM D1043-51. In this test, a sample of the material to be tested is placed in a clamp and cooled to a low temperature. Torque is then applied to twist the sample out of shape. The torque is then released and the time taken for the sample to return to normal is determined. If the sample returns to normal within 5 seconds, the material is considered flexible at the test temperature. The present product returned to normal shape within 5 second when twisted at a temperature of −20° C.

What is claimed is:

1. An epoxidized diester of a polyoxyethylene tetrahydrofuran dicarbinol containing from 2 to 8 oxyethylene groups per mol and two mols of a higher ethylenically unsaturated fatty acid wherein at least 25% of the unsaturation is converted to epoxide groups.

2. A substantially completely epoxidized diester of a polyoxyethylene tetrahydrofuran dicarbinol containing from 2 to 8 oxyethylene groups per mol and two mols of a higher ethylenically unsaturated fatty acid.

3. Polyoxyethylene (4) tetrahydrofuran dicarbinol di (9,10 epoxy stearate).

References Cited by the Examiner

UNITED STATES PATENTS

| | | | |
|---|---|---|---|
| 2,889,300 | 6/1959 | Dazzi | 260—30.4 |
| 2,993,913 | 7/1961 | Dunlop | 260—347.8 |
| 2,993,915 | 7/1961 | Luskin | 260—347.8 |
| 3,020,253 | 2/1962 | Lukes | 260—30.4 |

NICHOLAS S. RIZZO, *Primary Examiner.*

MORRIS LIEBMAN, JOHN D. RANDOLPH,
*Examiners.*